Feb. 9, 1937.                 C. P. BUTLER                  2,070,223
                                HEATER
                         Filed Dec. 9, 1935              2 Sheets-Sheet 1
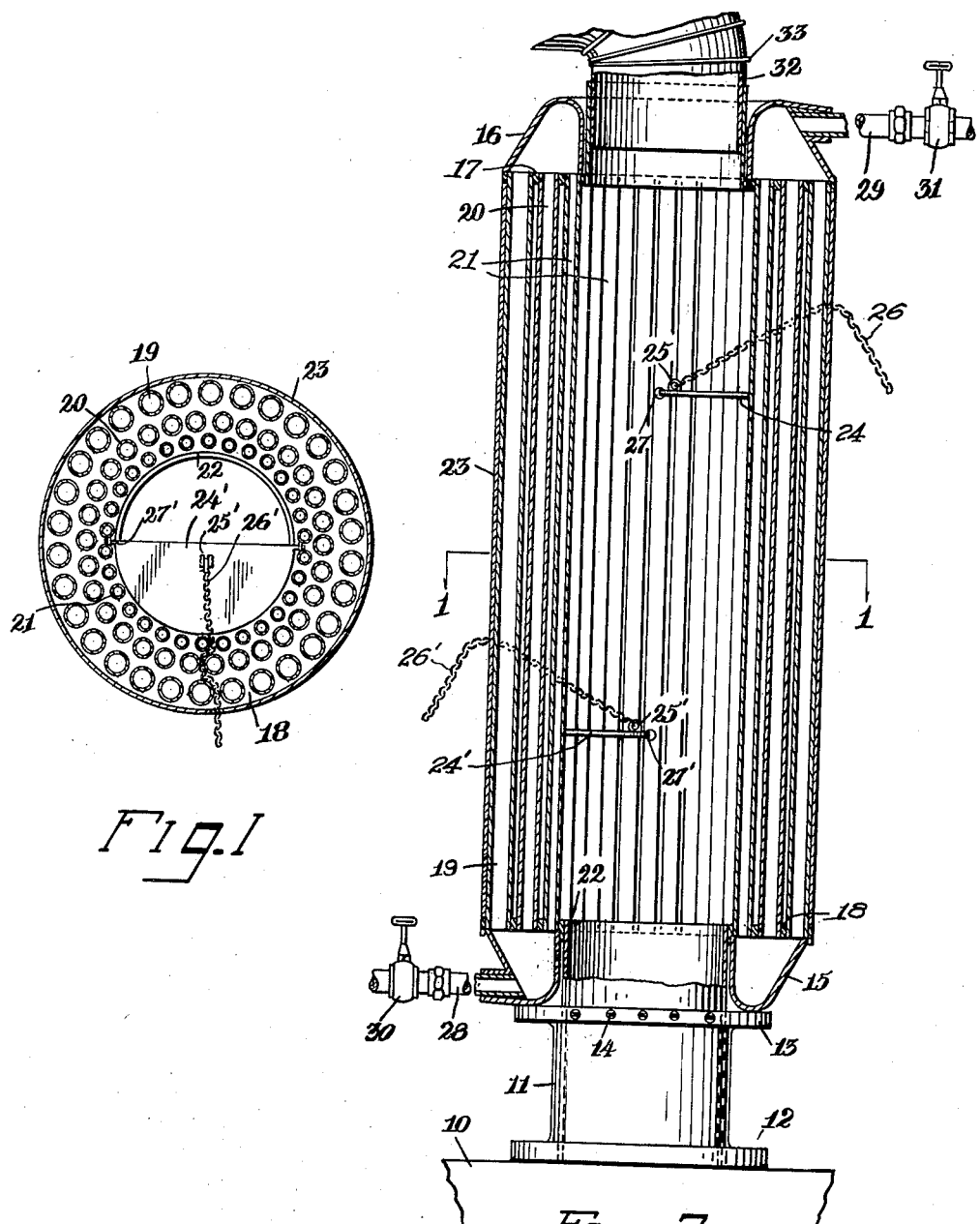
INVENTOR.
CARL POST BUTLER
BY Alexander Mencher
ATTORNEY.

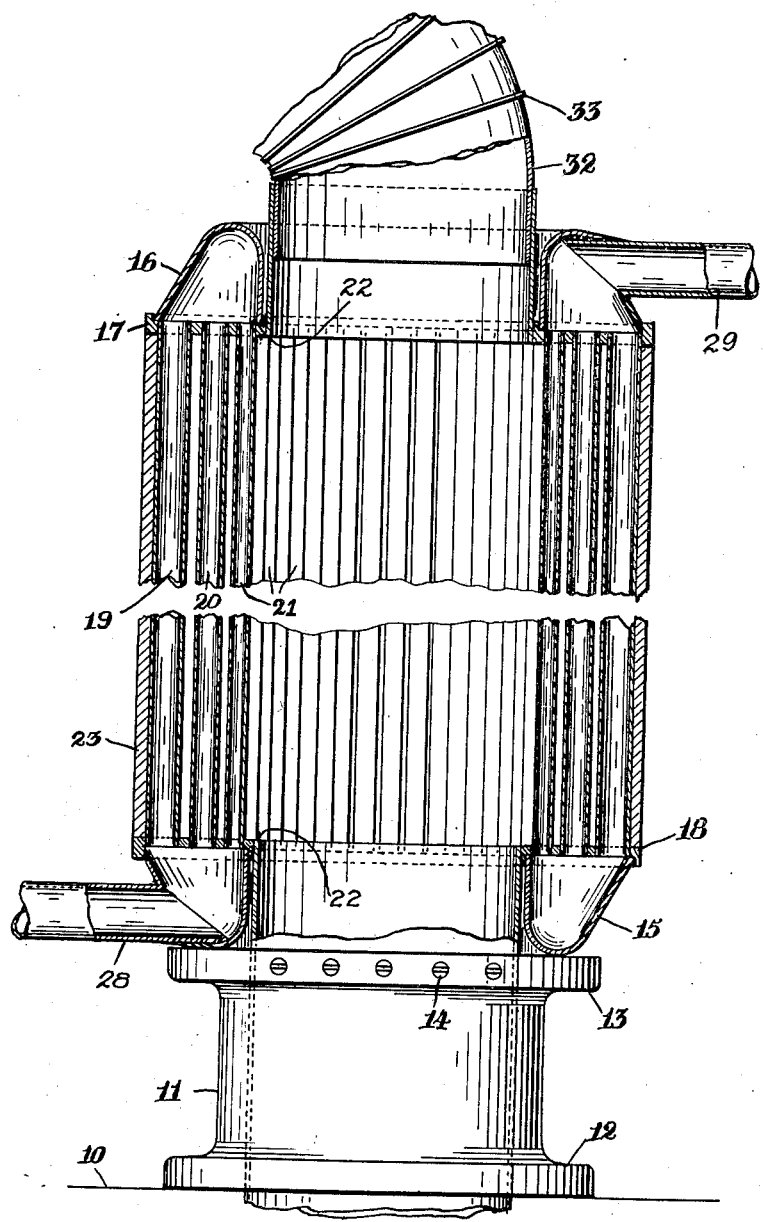

Patented Feb. 9, 1937

2,070,223

UNITED STATES PATENT OFFICE 2,070,223

HEATER

Carl Post Butler, New York, N. Y.

Application December 9, 1935, Serial No. 53,557

2 Claims. (Cl. 257—224)

This invention relates generally to heating devices such as for heating water of a hot water system, utilizing the waste heat of the products of combustion from burners, converters, furnaces and the like. More specifically, the invention relates to the construction of a heating unit which is readily applicable to any hot chamber or converter having an exposed flue pipe area to carry off the heated gases of combustion.

The main object of the invention herein resides in the provision of an efficient and practical heating device in the form of a conduit which is easily installed and assembled along and in communication with any exposed flue pipe to absorb the heat of the gases therein for purposes of heating water.

Another object of the invention resides in the provision of a unit which absorbs the heat in flue pipes located in a place where the excess heat therefrom is undesirable.

A further object of the invention is to construct the said unit so that it may be inserted in an already existing flue pipe with the minimum amount of cost and labor.

These objects and other incidental ends and advantages of the invention will hereinafter be set forth in the progress of the disclosure and as pointed out in the appended claims.

Accompanying this specification are drawings showing a preferred form of the invention wherein corresponding reference characters designate corresponding parts throughout the several views.

In accordance with the drawings:—

Figure 1 is a transverse sectional view of the unit in communicative connection with a hot gas flue pipe through the plane 1—1 of Figure 2.

Fig. 2 is a diametrical and longitudinal sectional view of the said unit in communicative connection with a hot gas flue pipe.

Fig. 3 is an enlarged broken view of Fig. 2.

The invention contemplates the most efficient utilization of waste heat emanating from hot flue pipes by the expedient of a specially constructed unit in the form of a conduit. This specially constructed unit is capable of being communicatively connected to an already existing flue pipe so that it is unnecessary to change the pre-existing system, whether it be a heating system or a system having a combustion chamber. Furthermore, the unit as constructed is capable of integral removal from the flue pipe line by the removal of a section of the flue pipe, the said unit being substituted therefor.

It has been found as a result of experiment, that by passing water through contiguous sets of concentrically arranged pipes exposed to hot gases, each set of pipes progressively increasing in diameter from the innermost set to the outermost, that maximum heat transfer to the water is effected. To most efficiently utilize such an arrangement, the applicant has constructed a casing to enclose the said sets of pipes utilizing two troughs as headers, the lower trough serving as the inlet for cold water and the upper trough serving as the outlet for the heated water, the two troughs being communicatively connected by the aforementioned sets of pipes. The innermost set of pipes serves as the walls of a cylindrical conduit through which the hot gases from the flue pipe proceed, the passage of such gases proceeding both in the direction of the axis of the flue pipe line and laterally thereof by virtue of the spacing between the pipes of the unit. The casing for the unit prevents the escape of the hot gases from the flue pipe line. Moreover, dampers are provided to control the rate, direction and duration of flow of the rising hot gases within the unit. Where the unit is installed in vertical position, a support is provided therefor in the form of a collar clamped to the flue pipe and being preferably proximate to the combustion chamber, said collar supporting the lower trough.

In accordance with the invention as embodied in a preferred form thereof shown in the accompanying drawings, numeral 10 designates a wall, the said wall lying in a horizontal plane as shown, of the combustion chamber of any heating or converting system, while 11 is a collar having a lower flange 12 and an upper flange 13. Collar 11 is shown extending vertically from wall 10 for the extension therethrough of a vertical flue pipe 22. For a horizontal flue pipe the said collar would have to extend in a horizontal direction. Lower flange 12 is affixed to wall 10 of the combustion chamber in any suitable manner, while the upper flange 13 is provided with a series of clamping screws 14 to frictionally engage flue pipe 22. Where collar 11 is not present on the wall of a combustion chamber, a narrow collar is applied to the flue pipe at the most proximate position possible to the said combustion chamber and clamped in place by means of the clamping screws 14.

Since the invention contemplates the construction of a unit, it should be mentioned at this time that installation is most expeditiously accomplished by removing a section of the flue pipe line and affixing thereto in place of the removed section, the unit.

Numeral 15 designates an annular trough affixed around, as by being brazed to, the lower terminal of the flue pipe line 22 after a section thereof has been removed. Trough 15 is preferably of copper and has a rounded bottom wall, a vertical inner wall running parallel with flue pipe 22 and a diverging outer wall. Such geometric construction, it has been found, is best suitable for maximum heat transfer. To make trough 15 water tight, the top thereof is provided with an annular and centrally orificed cover plate 18 preferably brazed to the upper edges of the trough, the said plate 18 being provided with a plurality of contiguous concentric sets of openings, the diameters of the openings in each set increasing progressively from the innermost set to the outermost.

Spaced above the annular trough 15 is a similar trough 16 in inverted position also provided with an annular and centrally orificed cover plate 17 brazed to the edges of the said trough, there being openings in said plate 17 registering with the openings in plate 18. Connecting the said troughs 15 and 16 are a plurality of concentrically arranged sets of pipes such as sets 19, 20, and 21 respectively. The pipes of the outermost set 19 have the largest diameter, the next set has pipes of smaller diameter, while the innermost set has pipes of the smallest diameter. These pipes are preferably brazed into the openings of plates 18 and 17 and serve to communicatively connect troughs 15 and 16. It is to be observed from Figure 3 that the outer and inner edges of upper plate 17 have an upwardly extending flange and that the outer and inner edges of lower plate 18 have a downwardly extending flange, the said flanges serving to engage the edges of the upper and lower troughs 16 and 15 respectively.

A practical construction of troughs 15 and 16 in conjunction with a flue pipe of eight and one-half inches diameter, connected by sets of pipes 19, 20, and 21, resides in providing plates 18 and 17 of copper and having an outside diameter of sixteen inches and a thickness of one-quarter inch. The concentrically arranged pipes in the sets of pipes 19, 20, and 21 are thirty in number, each thirty-six inches long, set 19 being one inch in diameter, set 20 being three-fourths inches in diameter and set 21 being one-half inch in diameter. Pipes 19, 20, and 21 are standard size, copper pipes and capable of withstanding one hundred and fifty pounds water pressure.

An outer casing, preferably a sheet iron shell 23 is employed to enclose sets of pipes 19, 20, and 21 and is preferably brazed to the perimetric edges of plates 18 and 17. The lower trough 15 is provided with an inlet passage 28 for cold water while the upper and inverted trough 16 is provided with an outlet passage 29 for hot water to be led into a hot water tank. Numerals 30 and 31 indicate the usual valves in conjunction with the inlet and outlet passages respectively.

The innermost set of pipes 21 serving as the walls of a cylindrical conduit through which the hot gases from the flue pipe proceed, is provided with heat retarders or dampers. The purpose of such retarders is to retard and direct the flow of the hot gases from the combustion chamber so that the maximum amount of heat may be transferred therefrom to sets of pipes 19, 20, and 21. The dampers 24 and 24' are of semi-circular shape and slightly larger in diameter than the internal diameter of flue pipe 22. The straight portions of the dampers 24 and 24' are pivotally affixed to the inner walls of pipes 21 at 27 and 27' so that the straight edges thereof are parallel. For thirty-six inch pipes, the dampers are affixed preferably ten inches from the ends thereof. On the upper surface of dampers 24 and 24' are cables 26 and 26' respectively pivotally affixed thereto at 25 and 25'. The cables penetrate shell 23 for purposes of outside manipulation. Of course, any other mode of suitable operation and construction of dampers to retard and direct the flow of the hot gases along the flue pipe line 22 is feasible, which augments the passage of the hot gases about the battery or sets of pipes 19, 20, and 21.

Numeral 32 designates a portion of an elbow section of flue pipe communicating with flue pipe 22, while 33 designates one of the ribs thereon. Thus, by removing an elbow section in the flue pipe communicating line, it becomes very simple indeed to remove that section of the flue pipe which is most proximate to the combustion chamber in order to install the unit above described. When the unit is in horizontal position, legs or supports may be applied to casing 23 at most suitable places instead of collar 13.

The construction described is suitable for waste gas products of 450 degrees F. to 800 degrees F. at the mouth of the unit, thereby heating water in quantities of 50–80 gallons per hour to a temperature of approximately 180 degrees F. For higher temperatures and different locations of the unit, changes may be made in size and number of the parts to best suit the condition.

I wish it distinctly understood that minor changes and variations in the number of pipes used, materials and sizes thereof, variations in the sizes, construction, materials and assemblage of the other parts both in combination and sub-combination, may all be resorted to without departing from the spirit of the invention and without departing from the scope of the appended claims.

I claim:—

1. A water heating device adapted to be inserted in a flue pipe line receiving hot products of combustion, comprising an annular trough coupled to the said flue pipe line, an inlet passage connected to the said trough, a spaced and opposite trough similarly coupled to the said flue pipe line, an outlet passage connected to the latter trough, cover members affixed to the said troughs and being provided with contiguous sets of concentrically disposed openings, pipes through the said openings communicatively connecting the upper and lower troughs, damper members within the central conduit formed from the said pipes between the said troughs to impede the progress of the hot products of combustion and an outer casing enclosing the said pipes.

2. A water heating device adapted to be inserted in a flue pipe line receiving hot products of combustion, comprising an annular trough coupled to the said flue pipe line, an inlet passage connected to the said trough, a spaced and opposite trough similarly coupled to the flue pipe line, an outlet passage connected to the latter trough, cover members affixed to the said troughs and being provided with contiguous sets of concentrically disposed openings, pipes through the said openings, the diameter of the pipes of each set progressively increasing from the innermost set to the outermost set, the said pipes communicatively connecting the upper and lower troughs, damper members within the central conduit formed from the said pipes between the troughs to impede the progress of the hot products of combustion, a supporting collar affixed round the flue pipe line and adapted to support one of the said troughs, and an outer casing enclosing the said pipes.

CARL POST BUTLER.